(12) United States Patent
Ling

(10) Patent No.: US 10,547,343 B2
(45) Date of Patent: Jan. 28, 2020

(54) SATELLITE COMMUNICATIONS SYSTEM USING TRANSCEIVER ARRAYS

(71) Applicant: Maxlinear, Inc., Carlsbad, CA (US)

(72) Inventor: Curtis Ling, Carlsbad, CA (US)

(73) Assignee: Maxlinear, Inc., Carlsbad, CA (US)

( * ) Notice: Subject to any disclaimer, the term of this patent is extended or adjusted under 35 U.S.C. 154(b) by 262 days.

(21) Appl. No.: 15/016,700

(22) Filed: Feb. 5, 2016

(65) Prior Publication Data

US 2016/0233942 A1 Aug. 11, 2016

Related U.S. Application Data

(60) Provisional application No. 62/112,239, filed on Feb. 5, 2015.

(51) Int. Cl.
  *H04B 1/40* (2015.01)
  *H04B 7/185* (2006.01)
  *H01Q 3/38* (2006.01)
  *H01Q 21/06* (2006.01)
  *H01Q 25/00* (2006.01)

(52) U.S. Cl.
  CPC .............. *H04B 1/40* (2013.01); *H01Q 3/385* (2013.01); *H01Q 21/064* (2013.01); *H01Q 25/00* (2013.01); *H04B 7/18517* (2013.01)

(58) Field of Classification Search
  CPC combination set(s) only.
  See application file for complete search history.

(56) References Cited

U.S. PATENT DOCUMENTS

| | | | | |
|---|---|---|---|---|
| 5,754,138 | A * | 5/1998 | Turcotte ................. | H01Q 1/288 342/372 |
| 6,201,508 | B1 * | 3/2001 | Metzen ............. | H01Q 13/0258 343/776 |
| 2003/0155976 | A1 * | 8/2003 | Weber ..................... | H01L 23/66 330/277 |
| 2008/0220819 | A1 * | 9/2008 | Ben-Eli ................ | H04B 7/0874 455/561 |

(Continued)

FOREIGN PATENT DOCUMENTS

WO  WO 2006/019290 A1 *  2/2006 ............... H01Q 1/12

*Primary Examiner* — Zhitong Chen
(74) *Attorney, Agent, or Firm* — McAndrews, Held & Malloy, Ltd.

(57) ABSTRACT

A system comprises a first transceiver circuit, a second transceiver circuit, and a first data bus. The first transceiver circuit is configured to receive first signals from first antenna elements, beamform the first signals to generate a first beamformed signal, downconvert the first beamformed signal as part of generation of a first downconverted beamformed signal, and transmit the first downconverted beamformed signal onto the first data bus. The second transceiver circuit is configured to receive second signals from second antenna elements, beamform the second signals to generate a second beamformed signal, downconvert the second beamformed signal as part of generation of a second downconverted beamformed signal, receive the first downconverted beamformed signal via the first data bus, and combine the first downconverted beamformed signal and the second downconverted beamformed signal to generate a combined signal for demodulation.

22 Claims, 9 Drawing Sheets

(56) References Cited

U.S. PATENT DOCUMENTS

| | | | |
|---|---|---|---|
| 2008/0268790 A1* | 10/2008 | Shi | H01Q 3/267 |
| | | | 455/73 |
| 2010/0090898 A1* | 4/2010 | Gallagher | H01Q 3/26 |
| | | | 342/373 |
| 2013/0286960 A1* | 10/2013 | Li | H04W 72/042 |
| | | | 370/329 |
| 2016/0269093 A1* | 9/2016 | Seol | H04B 7/043 |

* cited by examiner

US 10,547,343 B2

SATELLITE COMMUNICATIONS SYSTEM USING TRANSCEIVER ARRAYS

PRIORITY CLAIM

This application claims priority to the following application(s), each of which is hereby incorporated herein by reference:
U.S. provisional patent application 62/112,239 titled "Satellite Communications Using Transceiver Arrays" filed on Feb. 5, 2015.

INCORPORATION BY REFERENCE

The entirety of each of the following applications is hereby incorporated herein by reference:
U.S. patent application Ser. No. 14/931,103 titled "Transceiver Array" filed on Nov. 3, 2015.

BACKGROUND

Limitations and disadvantages of conventional methods and systems for communication systems will become apparent to one of skill in the art, through comparison of such systems with some aspects of the present invention as set forth in the remainder of the present application with reference to the drawings.

BRIEF SUMMARY

Systems and methods are provided for a transceiver array for satellite communications systems using transceiver arrays, substantially as shown in and/or described in connection with at least one of the figures, as set forth more completely in the claims.

Advantages, aspects and novel features of the present disclosure, as well as details of an illustrated embodiment thereof, will be more fully understood from the following description and drawings.

DETAILED DESCRIPTION

Figure 1A:
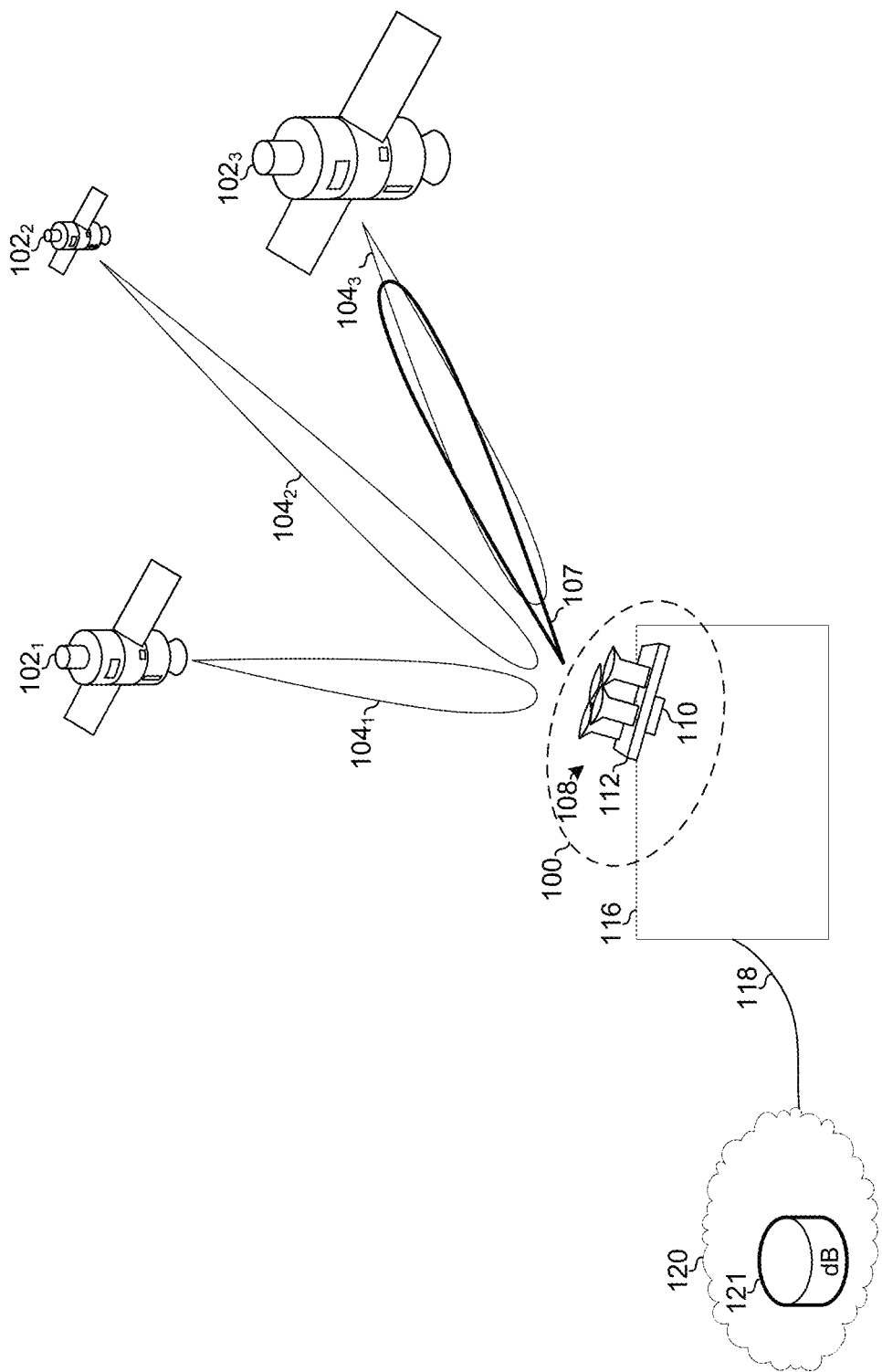
FIG. 1A shows a single-unit-cell transceiver array communicating with a plurality of satellites.

FIG. 1A shows a single-unit-cell transceiver array communicating with a plurality of satellites. Shown in FIG. 1 is a device 116 ("ground station") comprising a transceiver array 100 operable to communicate with a plurality of satellites 102. The device 116 may, for example, be a phone, laptop computer, or other mobile device. The device 116 may, for example, be a desktop computer, server, or other stationary device. In the latter case, the transceiver array 100 may be mounted remotely from the housing of the device 116 (e.g., via fiber optic cables). Device 116 is also connected to a network 120 (e.g., LAN and/or WAN) via a link 118. Although not shown, each of the satellites 102 may comprise circuitry similar to or the same as the transceiver 100.

Figure 2A:
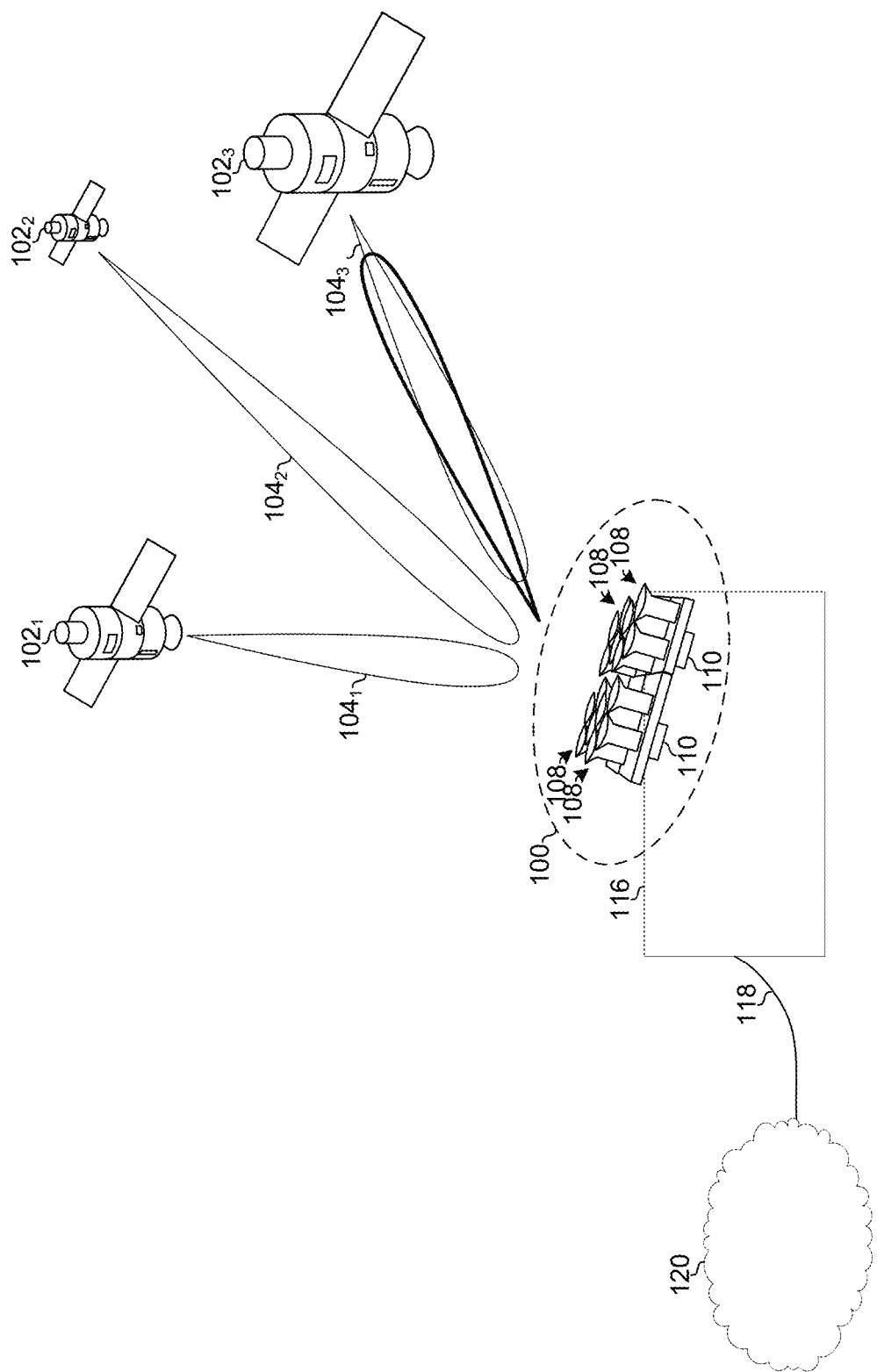
FIG. 2A shows a single-unit-cell transceiver array communicating with a plurality of satellites.
Figure 6:
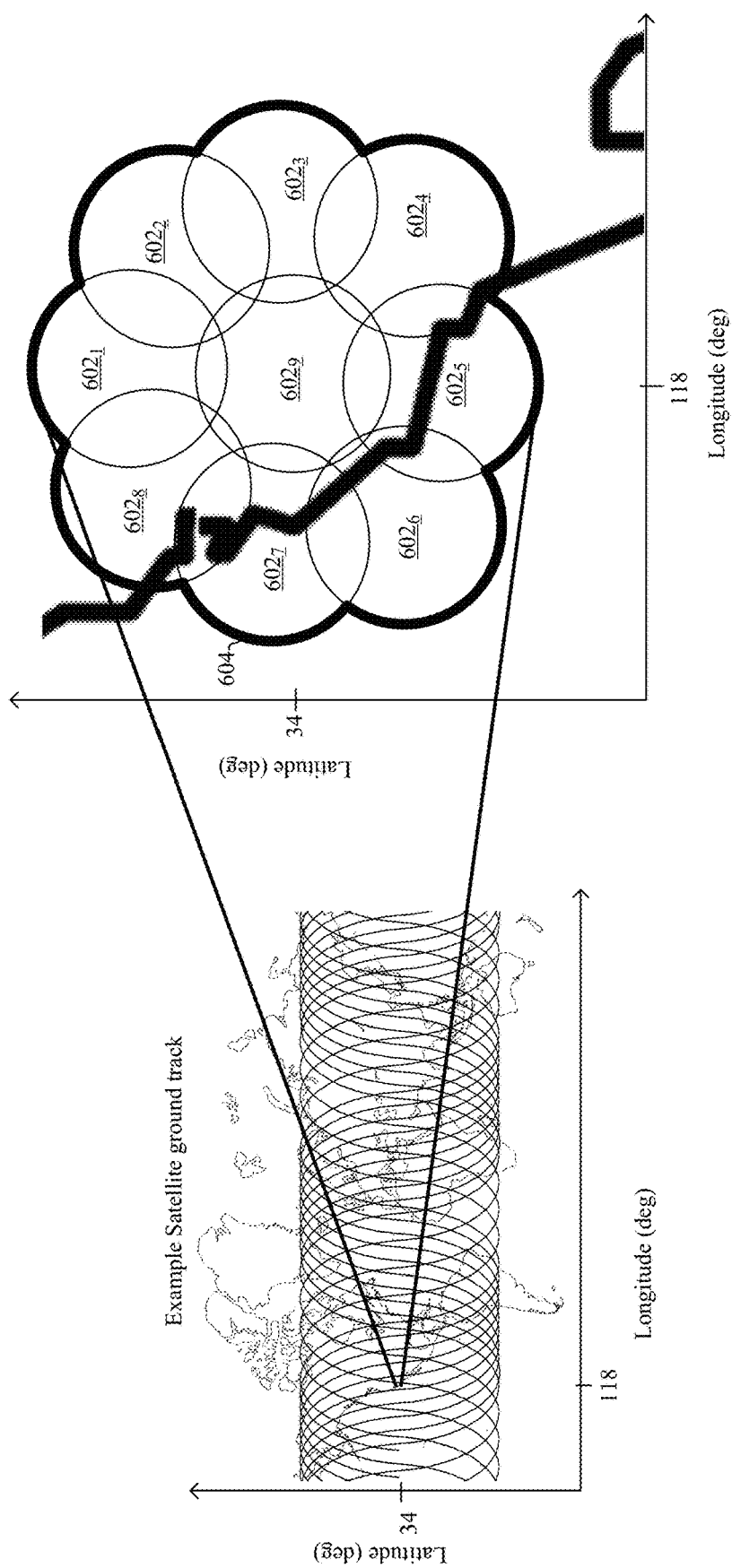
FIG. 6 is a flowchart illustrating an example satellite configuration.
Figure 7:
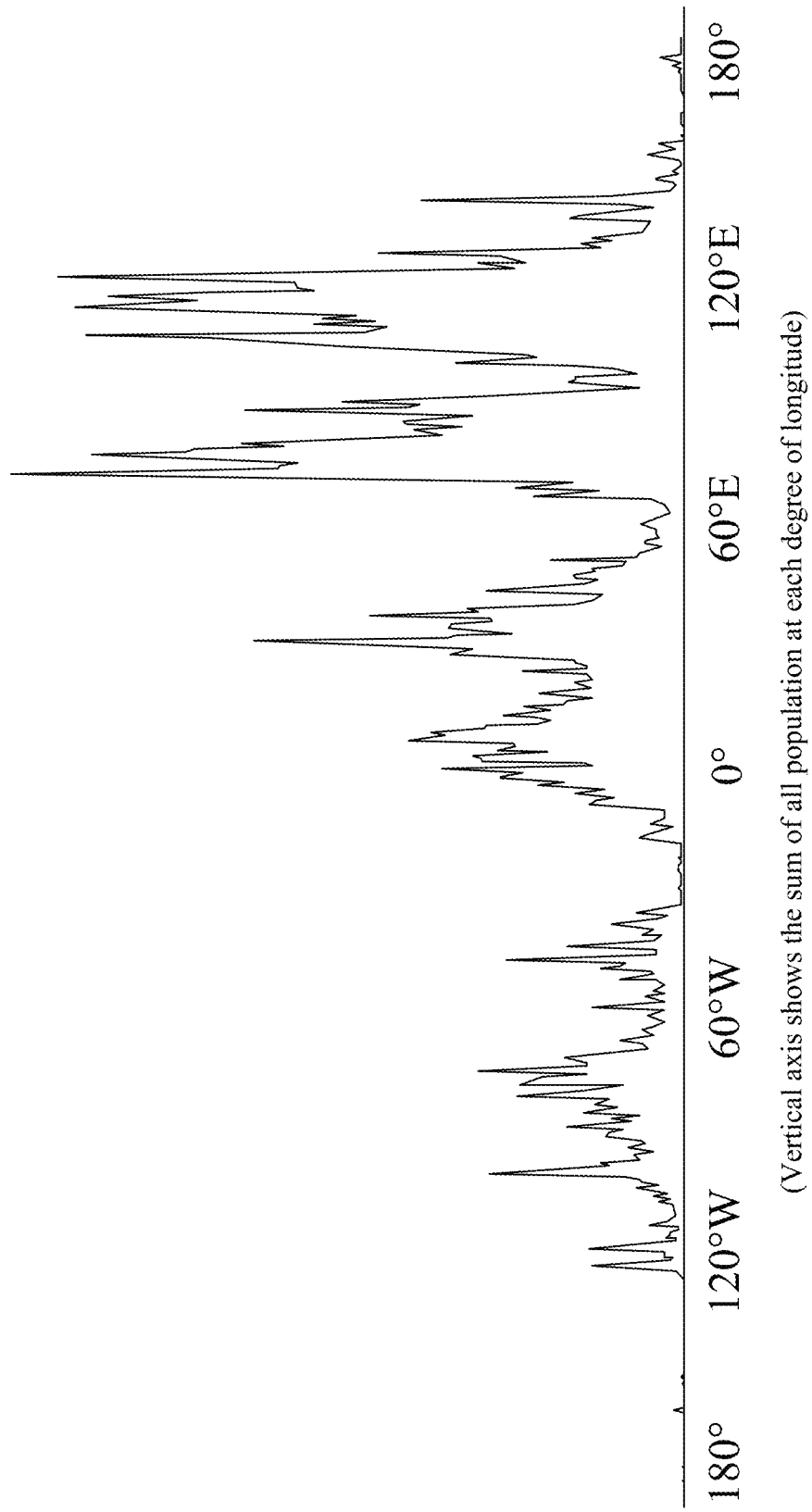
FIG. 7 illustrates the world's population by longitude.

In an example implementation, the satellites 102 shown in FIGS. 1A and 2A are just a few of hundreds, or even thousands, of satellites having a faster-than-geosynchronous orbit. For example, the satellites may be at an altitude of approximately 1100 km and have an orbit periodicity of around 100 minutes. The orbits of the satellites may be selected to provide throughput in proportion to the population density of the Earth. For example, as shown in FIG. 7, the Earth's population is very non-uniform across longitude. The satellites 102 may be put into orbits that provide more coverage of the longitudes with higher populations and less coverage of the longitudes with lower populations (e.g., as shown by the hypothetical ground track in FIG. 6).

Each of the satellites 102 may, for example, be required to cover 18 degrees viewed from the Earth's surface, which may correspond to a ground spot size per satellite of ~150 km radius. To cover this area (e.g., area 604 of FIG. 6), each satellite 102 may comprise a plurality of antenna elements generating multiple spot beams (e.g., the nine spot beams 602 of FIG. 6). In an example implementation, each of the satellites 102 may comprise one or more transceiver arrays, such as the transceiver array 100 described herein, operable to implement aspects of this disclosure. This may enable steering the coverage area of the spot beams without having to mechanically steer anything on the satellite 102. For example, when a satellite 102 is over a sparsely populated area (e.g., the ocean) but approaching a densely populated area (e.g., Los Angeles), the beams of the satellite 102 may be steered ahead such that they linger on the sparsely populated area for less time and on the densely populated area for more time, thus providing more throughput where it is needed.

Figure 1B:
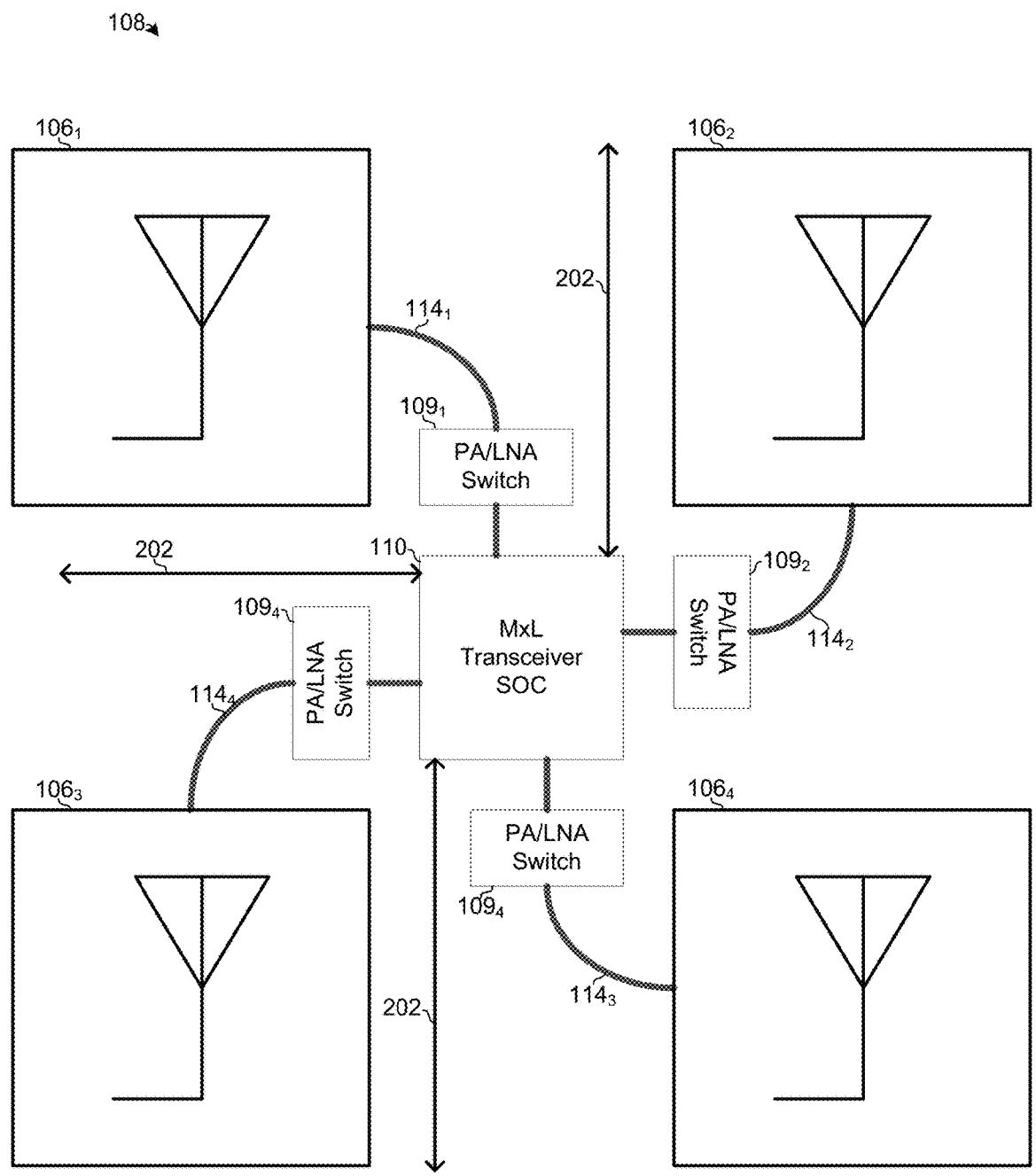
FIG. 1B shows details of an example implementation of the single-unit-cell transceiver array of FIG. 1A.
Figure 2B:
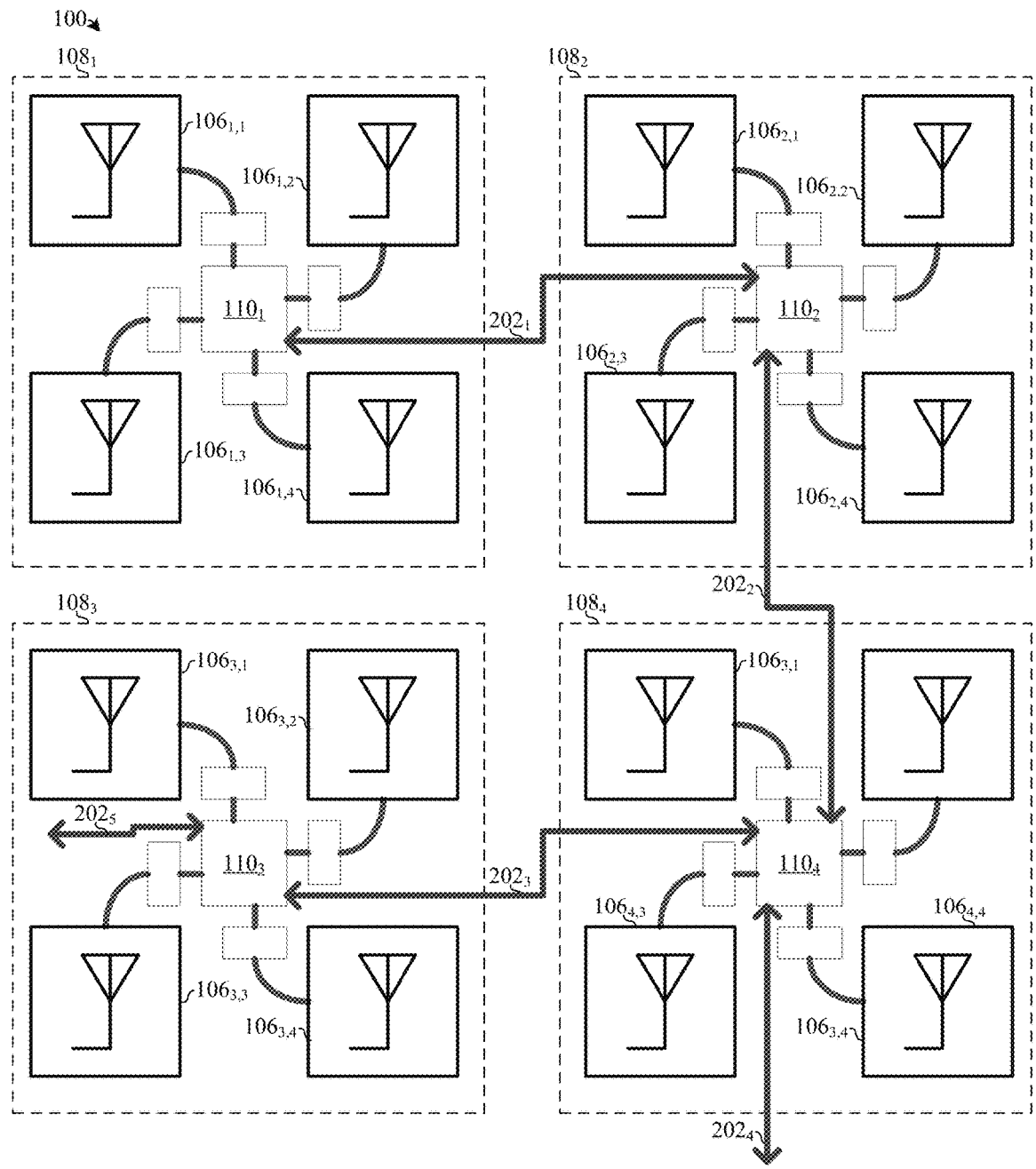
FIG. 2B shows details of an example implementation of the single-unit-cell transceiver array of FIG. 1A.

As shown in FIG. 1B, an example unit cell 108 of a transceiver array 100 comprises a plurality of antenna elements 106 (four antenna elements per unit cell 108 is used for illustration, but is not intended as limiting), a transceiver circuit 110, and, for a time-division-duplexing (TDD) implementation, a plurality of transmit/receive switches 109. The antenna elements 106 and circuit 110 may be mounted to a printed circuit board (PCB) 112. This is referred to herein as a "unit cell" because multiple instances of this unit cell 108 may be ganged together to form a larger transceiver array 100. In this manner, the architecture of a transceiver array 100 in accordance with various implementations of this disclosure may be modular and scalable. FIGS. 2A and 2B, for example, illustrate an implementation in which four unit cells 108, each having four antenna elements 106 and a transceiver circuit 110, have been ganged together to form a transceiver array 100 comprising sixteen antenna elements 106 and four transceiver circuits 110. The various unit cells 108 communicate with each other via data busses 202. In an example implementation, the data busses 202 are high-speed serial busses (e.g., high-speed serial busses similar to what is used in backplane applications) and/or one or more clock distribution traces (which may be referred to as a "clock tree").

Use of an array of antenna elements 106 enables beamforming for generating a radiation pattern having one or more high-gain beams. In general, any number of transmit and/or receive beams are supported. In an example implementation, however, the system may be power limited (e.g., in consumer applications) and thus only a single transmit beam may be practical.

In an example implementation, each of the antenna elements 106 of a unit cell 108 is a horn mounted to a printed circuit board (PCB) 112 with waveguide feed lines 114. The circuit 110 may be mounted to the same PCB 112. In this manner, the feed lines 114 to the antenna elements may be kept extremely short. For example, the entire unit cell 108 may be, for example, 6 cm by 6 cm such that length of the feed lines 114 may be on the order of centimeters. The horns may, for example, be made of molded plastic with a metallic coating such that they are very inexpensive. In another example implementation, each of the antenna elements is a patch antenna.

The ability of the transceiver array 100 to use beamforming to simultaneously receive from multiple of the satellites 102 may enable soft handoffs of the transceiver circuit 110 between satellites 102. Soft handoff may reduce downtime as the transceiver array 100 switches from one satellite 102 to the next. This may be important because the satellites 102 may be orbiting at speeds such that any particular satellite 102 only covers the transceiver array 100 for on the order of 1 minute, thus resulting in very frequent handoffs. For example, satellite $102_3$ may be currently providing primary coverage to the transceiver array 100 and satellite $102_1$ may be the next satellite to come into view after satellite $102_3$. The transceiver array 100 may be receiving data via beam $104_3$ and transmitting data via beam 107 while, at the same time, receiving control information (e.g., a low data rate beacon comprising a satellite identifier) from satellite $102_1$ via beam $104_1$. The transceiver array 100 may use this control information for synchronizing circuitry, adjusting beamforming coefficients, etc., in preparation for being handed-off to satellite $102_1$. The satellite to which the transceiver array 100 is transmitting may relay messages (e.g., ACKs or retransmit requests) to the other satellites from which transceiver array 100 is receiving.

In various example implementations, one or more antenna elements 106 may be shared among transmit and receive operations (full duplex and/or in a time division duplexed manner). For example, each of the antenna elements $106_{1,1}$-$106_{4,4}$ in FIG. 2B may be used for both transmit and receive concurrently and/or in non-overlapping time intervals. In various example implementations, one or more antenna elements 106 may be used only for transmit and one or more other antenna elements 106 may be used only for receive (for full duplex operation and/or for time division duplexed operation). The assignment of antenna elements to transmit or receive may be fixed (the transmit antenna elements are never coupled to receive front ends and/or receive antenna elements are never coupled to transmit front ends) or configurable (e.g., via one or more transmit receive switches which make and break coupling between antenna elements and transmit front ends and/or receive front ends). In such an embodiment, which antenna element(s) 106 are used for transmit and which antenna element(s) 106 are used for receive may be selected such that the transmit antenna elements are spatially interleaved with the receive antenna elements. For example, antennas $106_{1,1}$, $106_{2,1}$, $106_{3,1}$, $106_{4,1}$, $106_{1,4}$, $106_{2,4}$, $106_{3,4}$, and $106_{4,4}$ may be used for transmit and $106_{1,2}$, $106_{2,2}$, $106_{3,2}$, $106_{4,2}$, $106_{1,3}$, $106_{2,3}$, $106_{3,3}$, and $106_{4,3}$ may be used for receive.

Figure 3:
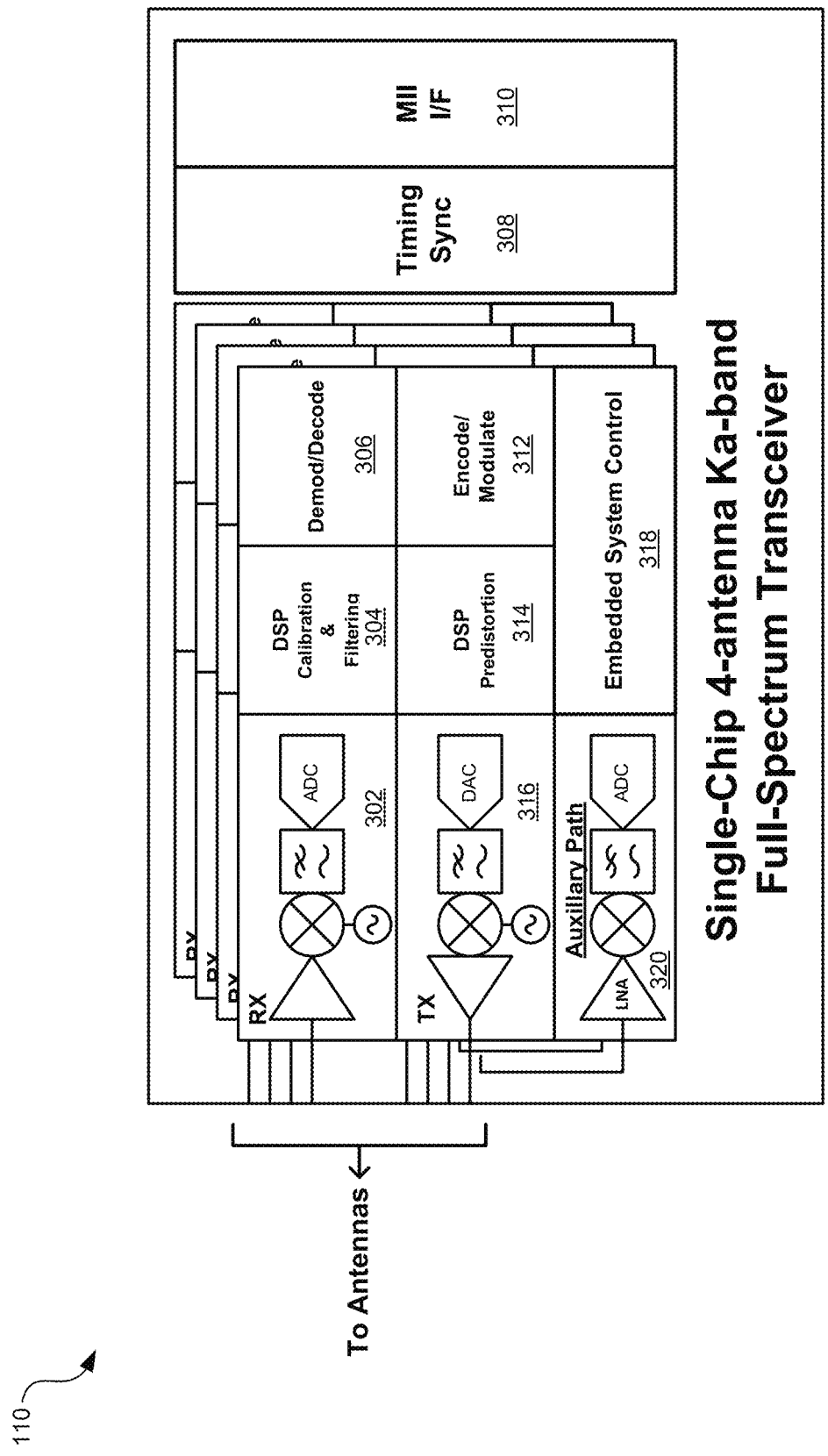
FIG. 3 depicts a unit-cell of a transceiver array in accordance with an example implementation of this disclosure.

FIG. 3 depicts a unit-cell of a transceiver array in accordance with an example implementation of this disclosure. The transceiver circuit 110 may be a single integrated circuit die (e.g., CMOS). In the example implementation shown, the transceiver circuit 110 comprises four data receive chains operating in the Ka band, four transmit chains operating in the Ka band, four auxiliary receive chains for receiving control signals (e.g., on an out-of-band channel), control circuitry, timing/synchronization circuitry, and an interface circuit for communicating with one or more other instances of the transceiver circuit 110 and/or a baseband processor. The transceiver circuit 110 may, for example, be implemented in a ground station or a satellite.

Each of the four data receive chains comprises an analog front-end circuit 302, a digital signal processing circuit 304, and a demodulator/decoder circuit 306. The analog front-end circuit 302 comprises a low-noise amplifier, a downconverter, a filter, and an analog-to-digital converter. The analog front end 302 may be a full spectrum capture front end operable to concurrently capture and digitize the entire spectrum on which a communication partner communicates (e.g., ~2.5 GHz of bandwidth centered at 20 GHz). The receive analog front-end 302 may be operable to introduce a gain and phase shift in accordance with beamforming coefficients/parameters provided to the receive analog front end 302. The receive digital signal processing circuitry 304 may be operable to, for example, perform filtering, calibration (e.g., calibration of in-phase and quadrature phase signal paths), and/or the like. The receive digital signal processing 304 may be operable to introduce a gain and phase shift in accordance with beamforming coefficients/parameters provided to the receive digital signal processing circuitry 304. The demodulator/decoder circuit 306 is operable to demodulate received signals in accordance with modulation schemes (e.g., QPSK, 8PSK, and/or higher-order modulation) used by its communication partner(s), and decode received signals in accordance with FEC algorithms schemes used by the communication partner(s).

Each of the four transmit chains comprises an analog front-end circuit 316, a digital signal processing circuit 314, and an encoder/modulator circuit 312. The analog front-end circuit 316 may comprise a power amplifier, an upconverter, a filter, and a digital-to-analog converter. The analog front-end circuit 316 may be operable to introduce a gain and phase shift in accordance with beamforming coefficients/parameters provided to the analog front end 316. The transmit digital signal processing circuitry 314 may be operable to, for example, perform power amplifier linearization, predistortion, and/or digital front end functions. The digital signal processing circuitry 314 may be operable to introduce a gain and/or phase shift in accordance with beamforming coefficients/parameters provided to the digital signal processing circuitry 314. The modulator/encoder circuit 312 is operable to modulate signals in accordance with modulation schemes (e.g., QPSK, 8PSK, and/or higher-order modulation) used by its communication partner(s), and encode signals in accordance with FEC algorithms schemes used by its communication partner(s). The modulator/encoder circuit 318 may be operable to introduce a gain and/or phase shift in accordance with beamforming coefficients/parameters provided to the modulator/encoder circuit 318.

Although each front-end circuit is depicted as having its own local oscillator, in another example implementation, all four transmit analog front-ends 316 and all four receive analog front-ends 302 may be driven by a single local oscillator. The need for only a single local oscillator may allow the local oscillator to be very high quality while still keeping overall system cost low. In such an implementation, the various local oscillators of a particular transceiver array 100 (one local oscillator per unit cell 108) may, for example, be phase locked in the manner described below with reference to FIG. 4.

To get multi-gigabit throughput (e.g., 5 Gbps half-duplex) to a satellite 102 in a commercially feasible manner generally involves an implementation having high power efficiency. In this regard, the fact that the transceiver array 100 is using very wide bandwidth (e.g., 2.5 GHz) means that transmit power is spread over a very wide spectrum. For example, the bandwidth may be 50 times wider than used for VSAT application which means that, in order to achieve the same performance, the system must transmit 50 times more power, or have 50 times more gain, or some combination of the two. Accordingly, in an example implementation, the power amplifiers in the front-ends 316 may operate in saturation, which may make a nonlinear modulation scheme such as QPSK or 8PSK suitable (as compared, for example, to using 16 or 64 QAM which may require higher linearity).

The power constraints of the transmit operations are not present for receive operations. Rather, the number of beams the transceiver array 100 can receive may be limited only by the dynamic range of the ADCs of front-ends 316. So, with sufficient dynamic range, the transceiver array 100 receives, for example, ten separate beams 104 without losing efficiency on any given one beam. Thus, in an example implementation, the power limited nature of the transmit operations and the high dynamic range of the receive ADCs may, for example, enable a receive to transmit throughput ratio of 10 to 1. This may be well suited for consumer applications where there is often much greater demand for downlink bandwidth (e.g., for multimedia streaming). The system may adjust this ratio, however, by adjusting the ratio of transmit time and receive time in the TDD architecture (i.e., adjusting the number and/or length of transmit frames and receive frames in any given period of time).

The scalable nature of the transceiver array 100, however, also permits additional transmit throughput in applications where addition transmit power can be used. By simply ganging more unit cells 108 together, additional transmit power can be achieved. This additional transmit power can be used for supporting higher-order modulations (which require higher linearity and thus less efficiency) and/or generating multiple concurrent beams. This is an advantage of the distributed architecture of the transceiver array 100 over an architecture in which a single PA drives the plurality of antenna elements through a splitter network. Such a single PA approach results in losses in a splitting network and also concentrates heat/power in a relatively small area. If n is the number of array elements, then power delivered to the communication partner from the transceiver array 100 goes up as 20 log(n). Accordingly, in an example implementation, transceiver circuits 110 may, for example, be powered up when additional power is available, additional transmit beams are desired (e.g., to concurrently transmit to multiple communication partners in multiple directions), and/or additional link budget is needed, and may be powered down when power conservation is needed, multiple transmit beams are not needed, and/or lower link budget can be tolerated.

In an example implementation, a transceiver array 100 may concurrently transmit to one communication partner in one direction while receiving from multiple communication partners in multiple directions. In an example implementation, the communication partner to which the transceiver array 100 transmits may coordinate the other satellites that are transmitting to the transceiver array 100 (e.g., transceiver array 100 send request for content to the first communication partner which then instructs the other communication partners to concurrently send portions of the requested content to the transceiver array 100).

The timing/synchronization circuit 308 is operable to generate symbol timing/sync signals and send, via interface 310, the timing/sync signals to other instances of transceiver circuit 110 that are in the same transceiver array 100. In this manner, all transceiver circuits 110 in the array are synced to the correct symbol timing. In an example implementation described below with reference to FIG. 5A, one of several instances of transceiver circuit 110 of the transceiver array 100 may perform symbol timing recovery and provide the recovered symbol timing to the other instances of transceiver circuit 110 in the transceiver array 100.

In an example implementation, the modulation/encoding functions for transmit and/or the demodulation/decoding functions for receive may be split among the circuit 110 and the baseband processor. For example, for transmit, the baseband processor may pass log-likelihood ratios to the circuit 110, and for receive, the circuit 110 may pass log-likelihood ratios to the baseband processor. This may reduce the required bandwidth of busses 202.

Figure 4:
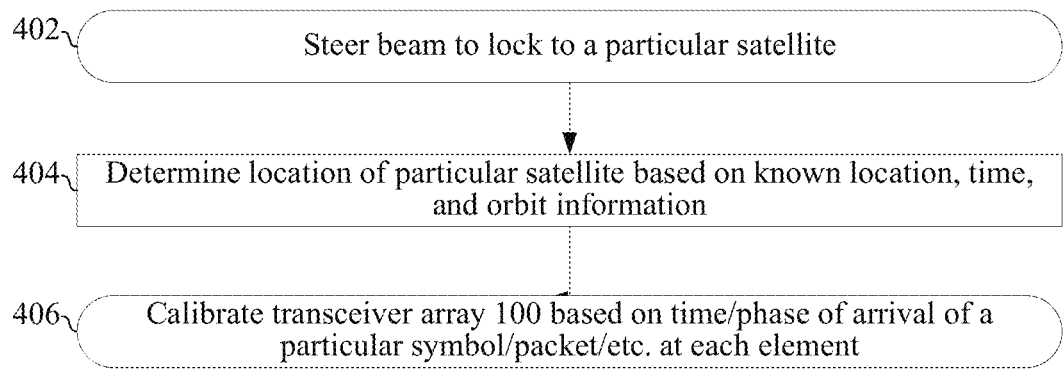
FIG. 4 is a flowchart illustrating an example process for calibration of a transceiver array in accordance with an implementation of this disclosure.

FIG. 4 is a flowchart illustrating an example process for calibration of a transceiver array in accordance with an implementation of this disclosure. In block 402, the transceiver array 100 steers its beam to lock to a particular satellite 102. In block 404, the transceiver array 100 determines the location of the satellite to which it is locked. It may do this based on knowledge of its own position, the current time (e.g., from GPS), and knowledge of the orbits of the satellites 102. An identifier of the satellite 102 may be received in a beacon transmitted by the satellite and used as an index to a database storing the orbit information. In block 406, the transceiver array 100 is calibrated based on time/phase of arrival of a particular symbol/packet/etc. at each of the antenna elements 106. In this regard, the known position of the satellite relative to the transceiver array 100 may be used to determine the angle of incidence of the symbol/packet/etc. The angle of incidence combined with knowledge of the physical characteristics of the transceiver array 100 (e.g., electrical distances between antenna elements 106) enables calculating the phase/time at which the symbol/packet etc. should arrive at each of the antenna elements 106 of the transceiver array 100. Deviations in the expected arrival phases/times may be attributed to phase offset of the local oscillators. Calibration based on these determined phase errors may comprise adjusting one or more of the oscillators, and/or compensating beamforming coefficients to be applied to signals processed using the one or more oscillators.

Figure 5:
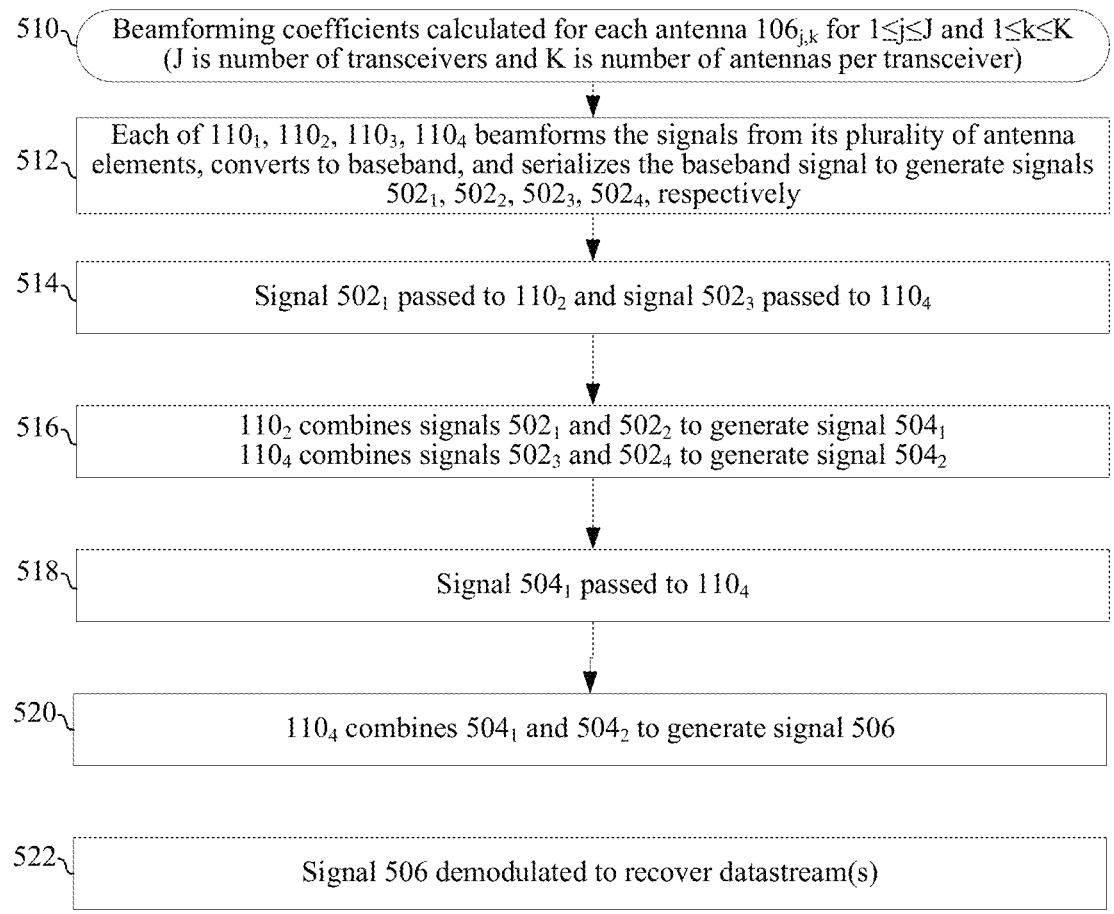
FIG. 5 is a flowchart illustrating an example process for reception via a transceiver array in accordance with an implementation of this disclosure.

FIG. 5 is a flowchart illustrating an example process for reception via a transceiver array in accordance with an implementation of this disclosure. The process begins with block 510 in which a beamforming coefficient $C_{i,j}$ (e.g., a complex number) is calculated for each antenna $106_{j,k}$ for $1 \leq j \leq J$ and $1 \leq k \leq K$, where J is the number of transceiver circuits 110 in the transceiver array 100 and K is number of antennas per transceiver (e.g., J=4 and K=4 in the example of FIG. 2B). The beamforming coefficient may be calculated based on known characteristics (e.g., electrical distances between antenna elements 106) of the transceiver array 100. In this regard, although different subsets of the antenna elements 106 are coupled to different transceiver circuits 110, the antenna elements 106 may be treated as a single array for purposes of calculating the beamforming coefficients.

In block 512, each transceiver circuit $110_j$ beamforms the signals from its plurality of antenna elements $106_{j,1}$ to $106_{j,K}$ using coefficients $C_{j,1}$-$C_{j,K}$, downconverts the beamformed signal (to IF or baseband), and serializes the downconverted, beamformed signal to generate a signal $502_j$ having bit rate B.

In block 514, a pass of signals generated in block 512 from one transceiver circuit 110 to another (toward one or more of the transceiver circuits 110 that interface(s) with external circuitry such as a baseband processor) is performed. Using FIG. 2B (J=4) as an example, the signal $502_1$ (bit rate B) is passed from transceiver circuit $110_1$ to transceiver circuit $110_2$ via bus $202_1$, and the signal $502_3$ (bit rate B) is passed from transceiver circuit $110_3$ to transceiver circuit $110_4$ via bus $202_3$.

In block 516, each transceiver circuit $110_j$ receiving a signal passed in block 514 combines the received signal with the signal it generated in block 512. Using FIG. 2B (J=4) as an example, transceiver circuit $110_2$ combines signals $502_1$ and $502_2$ (since the beamforming coefficients have already been applied, this may be a simple sum) to generate a signal $504_1$ having bit rate B, and the transceiver circuit $110_4$ combines signals $502_3$ and $502_4$ to generate a signal $504_2$ having bit rate B.

In block 518, a pass of signals generated in block 516 from one transceiver circuit 110 to another (toward one or more ingress/egress transceiver circuits 110—that is, a transceiver circuit 110 that interfaces with external circuitry such as a baseband processor) is performed. Using FIG. 2B (J=4) as an example, the signal $504_1$ (bit rate B) is passed from transceiver circuit $110_2$ to transceiver circuit $110_4$ (the ingress/egress transceiver circuit in the example of FIG. 2B) via bus $202_2$.

In block 520, each transceiver circuit $110_j$ receiving a signal passed in block 518 combines the received signal with the signal it generated in block 516. Using FIG. 2B (J=4) as an example, transceiver circuit $110_4$ combines signals $504_1$ and $504_2$ (since the beamforming coefficients have already been applied, this may be a simple sum) to generate a signal 506 having bit rate B.

In block 522, the signal 506 is demodulated to recover one or more datastreams corresponding to one or more receive beams. Using FIG. 2B (J=4) as an example, demodulation may take place in the circuit $110_4$ and/or in a baseband processor to which signal 506 may be transmitted via bus $202_4$.

Although FIG. 5 has been described with reference to the 2×2 array of FIG. 2B, the same general process applies to larger array (although the number of passing blocks (such as 514 and 518) and combining blocks (such as 516 and 520) may increase with array size).

Achieving sufficient quality of the combined signal resulting from the process of FIG. 5 may require the various transceiver circuits $110_1$ to $110_J$ to be synchronized to a common symbol timing. In an example implementation, this may be achieved by each transceiver circuit $110_j$ initially (e.g., upon power up or reset, upon triggering of recalibration as a result of a quality metric falling below a threshold, and/or the like) using a default symbol timing (e.g., all using a same offset value), the symbols being passed to the ingress/egress transceiver circuit $110_j$ without combining, and then the ingress/egress transceiver performing a symbol timing search, which may comprise, for example, correlating the signal from a reference transceiver circuit $110_j$ (e.g., itself) against each other signal from each other transceiver circuit 110, and then reporting the offsets back to the other transceiver circuits. Once the offsets are known, normal operation may begin and combining such as described with respect to FIG. 5 may begin.

In accordance with an example implementation of this disclosure, a system comprises a first transceiver circuit (e.g., $110_3$), a first plurality of antenna elements (e.g., $106_{3,1}$-$106_{3,4}$), a second transceiver circuit (e.g., $110_4$), a second plurality of antenna elements (e.g., $106_{4,1}$-$106_{4,4}$), and a first data bus (e.g., $202_3$). The first transceiver circuit is configured to receive a first plurality of signals from the first plurality of antenna elements, beamform the first plurality of signals to generate a first beamformed signal, downconvert the first beamformed signal as part of generation of a first downconverted beamformed signal, and transmit the first downconverted beamformed signal onto the first data bus. The second transceiver circuit is configured to receive a second plurality of signals from the second plurality of antenna elements, beamform the second plurality of signals to generate a second beamformed signal, downconvert the second beamformed signal as part of generation of a second downconverted beamformed signal, receive the first downconverted beamformed signal via the first data bus, and combine the first downconverted beamformed signal and the second downconverted beamformed signal to generate a combined signal for demodulation. A first subset (e.g., $C_{3,1}$-$C_{3,4}$) of a plurality of beamforming coefficients (e.g., $C_{3,1}$-$C_{4,4}$) may be used for the beamforming of the plurality of signals from the first plurality of antenna elements, a second subset (e.g., $C_{4,1}$-$C_{4,4}$) of the plurality of beamforming coefficients may be used for the beamforming of the plurality of signals from the second plurality of antenna elements, and the beamforming coefficients are such that a signal from a first source that is incident on both the first plurality of antenna elements and the second plurality of antenna elements is reinforced while a signal from a second source that is incident on both the first plurality of antenna elements and the second plurality of antenna elements is suppressed. The first source may be a satellite (e.g., $102_2$). One or both of the first transceiver circuit and the second transceiver circuit may be operable to recover an identifier of the satellite carried in the plurality of signals, and determine a location of the satellite relative to the first plurality of antennas based on the identifier. The one or both of the first transceiver circuit and the second transceiver circuit may be operable to determine an angle of incidence of the signal from the first source based on the location of the satellite, and compensate one or more local oscillators and/or one or more of the plurality of beamforming coefficients based on the determined angle of incidence. The determination of the location of the satellite may comprise communication with a satellite tracking database (e.g., 121). Each of the first transceiver circuit and the second transceiver circuit may comprise a CMOS die with an on-chip power amplifier. The first transceiver circuit may comprise an expansion interface (e.g., bus $202_5$ and corresponding bus adaptor circuitry (e.g., a SERDES)) for coupling to a third transceiver circuit. The system may comprise a second data bus (e.g., $202_5$), a third transceiver circuit (e.g., a transceiver circuit $110_5$ coupled to $110_3$ via bus $202_5$), and a third plurality of antenna elements. The third transceiver circuit may be configured to receive a third plurality of signals from the third plurality of antenna elements, beamform the third plurality of signals to generate a third beamformed signal, downconvert the third beamformed signal to generate a third downconverted beamformed signal, and transmit the first downconverted beamformed signal onto the second data bus. The first transceiver circuit may be configured to receive the third downconverted beamformed signal via the second data bus, and the generation of the first downconverted beamformed signal may comprises combining of: a signal resulting from the downconversion the first beamformed signal, and the third downconverted beamformed signal. The first transceiver circuit may be dynamically (i.e., during operation between transmission bursts) powered up and down based on a power consumption budget (e.g., powered up when more power consumption can be tolerated and powered down when power conservation is required). The first transceiver circuit may be dynamically (i.e., during operation between transmission bursts) powered up and down based on a receiver performance metric (e.g., signal to noise ratio, bit error rate, etc.).

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set $\{(x), (y), (x, y)\}$. In other words, "x and/or y" means "one or both of x and y". As another example, "x, y, and/or z" means any element of the seven-element set $\{(x), (y), (z), (x, y), (x, z), (y, z), (x, y, z)\}$. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled or not enabled (e.g., by a user-configurable setting, factory trim, etc.).

Other embodiments of the invention may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the processes as described herein.

Accordingly, the present invention may be realized in hardware, software, or a combination of hardware and software. The present invention may be realized in a centralized fashion in at least one computing system, or in a distributed fashion where different elements are spread across several interconnected computing systems. Any kind of computing system or other apparatus adapted for carrying out the methods described herein is suited. A typical combination of hardware and software may be a general-purpose computing system with a program or other code that, when being loaded and executed, controls the computing system such that it carries out the methods described herein. Another typical implementation may comprise an application specific integrated circuit or chip.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A system comprising:
a first transceiver circuit, a second transceiver circuit, and a first data bus, wherein the first transceiver circuit and the second transceiver circuit are unsynchronized, and wherein:
said first transceiver circuit is configured to:
receive a first plurality of signals from a first plurality of antenna elements;
beamform said first plurality of signals to generate a first beamformed signal;
downconvert said first beamformed signal as part of generation of a first downconverted beamformed signal; and
transmit said first downconverted beamformed signal onto said first data bus; and
said second transceiver circuit is configured to:
receive a second plurality of signals from a second plurality of antenna elements;
beamform said second plurality of signals to generate a second beamformed signal;
downconvert said second beamformed signal as part of generation of a second downconverted beamformed signal;
receive said first downconverted beamformed signal via said first data bus; and
combine said first downconverted beamformed signal and said second downconverted beamformed signal to generate a combined signal for demodulation, wherein said first downconverted beamformed signal is combined with said second downconverted beamformed signal according to a time offset that is determined from a correlation of said first downconverted beamformed signal against said second downconverted beamformed signal.

2. The system of claim 1, wherein:
a first subset of a plurality of beamforming coefficients are used for said beamforming of said plurality of signals from said first plurality of antenna elements;
a second subset of said plurality of beamforming coefficients are used for said beamforming of said plurality of signals from said second plurality of antenna elements; and
said beamforming coefficients are such that a signal from a first source that is incident on both said first plurality of antenna elements and said second plurality of antenna elements is reinforced, and a signal from a second source that is incident on both said first plurality of antenna elements and said second plurality of antenna elements is suppressed.

3. The system of claim 2, wherein:
said first source is a satellite;
one or both of said first transceiver circuit and said second transceiver circuit is operable to:
recover an identifier of said satellite carried in said plurality of signals; and determine a location of said satellite relative to said first plurality of antenna elements based on said identifier.

4. The system of claim 3, wherein said one or both of said first transceiver circuit and said second transceiver is operable to:
determine an angle of incidence of said signal from said first source based on said location of said satellite; and
compensate one or more local oscillators and/or one or more of said plurality of beamforming coefficients based on said determined angle of incidence.

5. The system of claim 3, wherein said determination of said location of said satellite comprises communication with a satellite tracking database.

6. The system of claim 1, wherein each of said first transceiver circuit and said second transceiver circuit comprises a CMOS die with an on-chip power amplifier.

7. The system of claim 1, wherein said first transceiver circuit comprises an expansion interface for coupling to a third transceiver circuit.

8. The system of claim 1, comprising a second data bus and a third transceiver circuit, wherein:
said third transceiver circuit is configured to:
receive a third plurality of signals from a third plurality of antenna elements;
beamform said third plurality of signals to generate a third beamformed signal;
downconvert said third beamformed signal to generate a third downconverted beamformed signal; and
transmit said first downconverted beamformed signal onto said second data bus;
said first transceiver circuit is configured to receive said third downconverted beamformed signal via said second data bus; and
said generation of said first downconverted beamformed signal comprises combining of:
a signal resulting from said downconversion said first beamformed signal; and
said third downconverted beamformed signal.

9. The system of claim 1, wherein said first plurality of antennas comprises a plurality of molded-plastic horn antennas with a metal coating.

10. The system of claim 1, comprising a third plurality of antenna elements, wherein:
said first transceiver comprises a plurality of receive front end circuits coupled to said first plurality of antenna elements for said reception of said first plurality of signals;
said first transceiver comprises a plurality of transmit front end circuits coupled to said third plurality of antenna elements.

11. The system of claim 1, wherein:
a plurality of receive front end circuits are not coupled to a third plurality of antenna elements; and
said plurality of transmit front end circuits are not coupled to said first plurality of antenna elements.

12. A method comprising:
receiving, by a first transceiver circuit, a plurality of signals from a corresponding first plurality of antenna elements;
beamforming, by said first transceiver circuit, said plurality of signals to generate a first beamformed signal;
downconverting, by said first transceiver circuit, said first beamformed signal as part of generating a first downconverted beamformed signal;
receiving, by a second transceiver circuit, a plurality of signals from a corresponding second plurality of antenna elements, wherein the first transceiver circuit and the second transceiver circuit are unsynchronized;
beamforming, by said second transceiver circuit, said plurality of signals to generate a second beamformed signal;
downconverting, by said second transceiver circuit, said second beamformed signal as part of generating a second downconverted beamformed signal;
conveyeing, by said first transceiver circuit via a data bus, said first downconverted beamformed signal to said second transceiver circuit; and
combining, by said second transceiver circuit, said first downconverted beamformed signal and said second downconverted beamformed signal to generate a combined signal to be demodulated, wherein said combining of said first downconverted beamformed signal and said second downconverted beamformed signal is based on to a time offset that is determined from a correlation of said first downconverted beamformed signal against said second downconverted beamformed signal.

13. The method of claim 12, comprising calculating a plurality of beamforming coefficients wherein:
a first subset of said beamforming coefficients are used for said beamforming said plurality of signals from said first plurality of antenna elements;
a second subset of said beamforming coefficients are used for said beamforming said plurality of signals from said second plurality of antenna elements; and
said beamforming coefficients are such that electromagnetic energy from a first source that is incident on both said first plurality of antenna elements and said second plurality of antenna elements is reinforced, and electromagnetic energy from a second source that is incident on both said first plurality of antenna elements and said second plurality of antenna elements is suppressed.

14. The method of claim 12, wherein a first source is a satellite and comprising:
recovering, by one or both of said first transceiver circuit and said second transceiver circuit, an identifier of said satellite carried in said plurality of signals; and
determining, by said one or both of said first transceiver circuit and said second transceiver circuit, a location of said satellite relative to said first plurality of antennas based on said identifier.

15. The method of claim 14, comprising:
determining, by said one or both of said first transceiver circuit and said second transceiver circuit, an angle of incidence of said signal from said first source based on said location of said satellite; and
compensating, by said one or both of said first transceiver circuit and said second transceiver circuit, one or more local oscillators and/or one or more of said plurality of beamforming coefficients based on said determined angle of incidence.

16. The method of claim 14, wherein said determining said location of said satellite comprises communicating with a satellite tracking database.

17. The method of claim 12, wherein each of said first transceiver circuit and said second transceiver circuit comprises a CMOS die with an on-chip power amplifier.

18. The method of claim 13, wherein said first transceiver circuit comprises an expansion interface for coupling to a third transceiver circuit.

19. The method of claim 12, comprising:
receiving, by a third transceiver circuit, a third plurality of signals from a third plurality of antenna elements;

beamforming, by said third transceiver circuit, said third plurality of signals to generate a third beamformed signal;

downconverting, by said third transceiver circuit, said third beamformed signal as part of generating a third downconverted beamformed signal;

transmitting, by said third transceiver circuit, said first downconverted beamformed signal onto a second data bus;

receiving, by said first transceiver circuit, said third downconverted beamformed signal via said second data bus; and as part of said generating said first downconverted beamformed circuit by said first transceiver circuit, combining:
- a signal resulting from said downconverting said first beamformed signal; and
- said third downconverted beamformed signal.

20. The method of claim 12, wherein said first plurality of antennas comprises a plurality of molded-plastic horn antennas with a metal coating.

21. The method of claim 12, comprising dynamically powering up and powering down said first transceiver circuit based on a power consumption budget.

22. The method of claim 12, comprising dynamically powering up and powering down said first transceiver circuit based on a receiver performance metric.

* * * * *